Patented Feb. 11, 1941

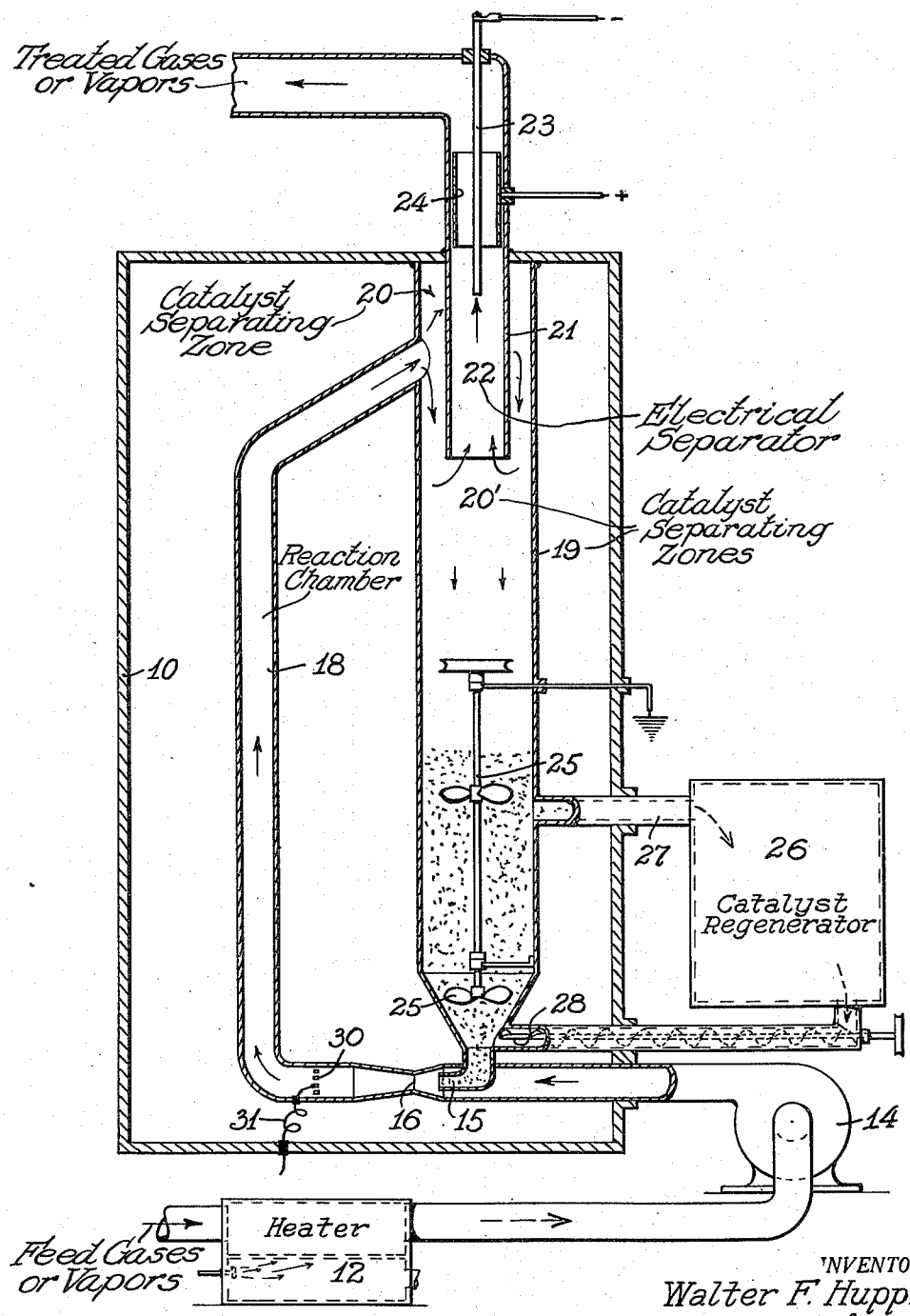

2,231,424

UNITED STATES PATENT OFFICE 2,231,424

CATALYTIC METHOD

Walter F. Huppke, Lomita, Calif., assignor to Union Oil Company of California, Los Angeles, Calif., a corporation of California Application August 9, 1937, Serial No. 158,167

7 Claims. (Cl. 260—683)

This invention relates to the treatment of various materials with catalysts to effect chemical reaction, such as the hydrogenation, polymerization and like modifications of hydrocarbons, both liquids and gases and including the paraffinic, naphthenic and kindred classifications.

The principal object of the invention is to provide a method for effecting superior contact between catalysts and the materials upon which they are intended to act. In ordinary practices the catalytic treatment of gases for example, as in the case of the dehydrogenation of petroleum or other hydrocarbon gases, has been effected by passing the gas or vapor over a catalyst contained in a reaction tube or chamber in granular form.

I have found, however, that the catalytic effects may be greatly improved and the life of the catalyst may be prolonged substantially, by effecting a contact of the catalyst in very finely divided form as distinguished from the usual granular form.

The present invention therefore resides in effecting catalytic contacts by producing a suspension of the catalyst in a very finely powdered form in the presence of the gases or vapors upon which the catalyst is to operate. More particularly the finely powdered catalyst is circulated with gases at the desired reaction temperature at a velocity sufficient to keep the catalyst in turbulence and in suspension in the gases or vapors being treated until the conversion sought has been accomplished. Or, the fine catalyst may be dusted into a chamber and allowed to settle through the gases, in some instances. The invention is particularly applicable to the hydrogenation or dehydrogenation of petroleum and other hydrocarbon gases and vapors, and kindred operations, including polymerization and also reforming operations for gasoline constituents wherein the chemical structure of at least a portion of the gasoline content is converted into compounds possessing high anti-knock values capable of imparting high anti-knock ratings to motor fuels.

In the accompanying drawing, I show by way of illustration a simple type of equipment whereby finely powdered catalyst is circulated as by means of a blower in contact with the gases or vapors undergoing treatment, the final separation of the catalyst powder being effected by some type of precipitator such as a Cottrell electric precipitator.

Here catalyzing and catalyst-precipitating apparatus is housed in a suitable heated or insulating jacket 10. The gas or vapor to be treated which will have been heated or treated to a suitable temperature and condition in a coil or other type of heater 12 is passed as by means of a blower 14 into the apparatus within the housing 10 where it is forced through a device for mixing the gas or vapor with the catalyst as by being moved past an injector nozzle 15 and through a mixing device such as a venturi 16, the hot gases and suspended powdered catalyst passing through an enlarged and elongated reaction chamber 18 which may be individually heated if required. The chamber 18 is of sufficient length and capacity to permit the desired reactions to take place.

The rate of flow of the hot gas is so regulated as to keep the powdered catalytic material in suspension for a sufficient length of time with respect to the length of the chamber to insure the desired reactions. This rate of gas flow might be such that there is a tendency of the catalyst to settle substantially with respect to the moving gas so that there is a relatively long period of treatment, or it may be more rapid so that the gas and catalyst are carried through in a much shorter length of time, according to the reaction period required. Of course the longer the passage the higher the rate may be.

Following the catalytic reactions in the chamber 18, treated gases or vapors and the suspended catalyst are passed into a separating zone 20 in a chamber 19. Into this zone there depends a pipe or tubing 21 which causes the relatively narrow stream of gases leaving the reaction chamber 18 and passing through the zone 20 to be directed downward in the chamber 19 for settling out of as much of the catalyst as possible from the treated gases. The cross sectional area of the chamber 19 both in the zone 20 surrounding the depending tube 21 and in that portion of the zone indicated at 20' below the tube 21, is such, with respect to the cross sectional area of the reaction chamber 18, as to produce with respect to movement in chamber 18, a relative quiescence in both sections of zones 20 and 20', thereby facilitating the settling of the catalyst. From the lower enlarged portion or settling zone 20', the gases, together with any remaining unsettled catalyst, pass upward through the tube 21 into a third separating zone 22 which also has a cross sectional area with respect to the cross sectional area of chamber 18 to effect a lower velocity and permit catalyst settling.

To insure substantially complete settling or precipitation of catalyst from the gases, zone 22 preferably is in the form of the well known Cottrell electric precipitator, or similar precipitator. Here an electrode 23 is suspended in the center of the chamber or zone 22 to cooperate with a surrounding electrode 24 or the like and develop an electrostatic charge according to the well known phenomenon, with the result that the charged catalyst particles drop out or are "precipitated," the treated gases passing on out of the system through tube 21 for further treatment if desired, and eventual recovery. As was above indicated, the diameter of this zone is such with respect to the velocity of gas as to permit the precipitated and agglomerated catalyst particles to drop out of gas stream and settle through the lower portion of zone 20 into the bottom of the chamber 19, whose lower end communicates with the nozzle 15. The lower portion of chamber 19 may contain any type of means such as generally indicated by a grounded agitator 25 for breaking up resultant agglomerated catalyst masses to reduce them to their desired finely powdered state and to remove the electric charge which the particles acquired in the electrical separating zone 22, prior to its return to the cycle by way of nozzle 15. Where the catalyst requires regeneration before reuse it may be withdrawn or partly withdrawn from chamber 19 to a catalyst reactivator generally indicated at 26, as by means of a conveyor tube 27 or the like, regenerated as by means of heat, oxygen, air and/or steam, or other necessary or preferred regenerating treatment, and returned to the catalyst settling chamber 19 as by means of a conduit and screw conveyer indicated at 28.

In some instances, it is desired to impart a charge to catalyst particles. For example, such a charge may be a negative charge for neutralizing any charge which may be carried by any hydrogen present, or for causing adequate agglomeration of residual catalyst particles in the final catalyst separation stage. For this purpose I may interpose an insulated coarse screen or grid 30 in the initial portion of chamber 18 beyond venturi 16 and impress upon it a low potential by means of conductor 31.

According to this invention the catalyst powder should be very fine, preferably of less magnitude than the mean free path of the activated molecules of gas at reaction temperature. By using such a finely divided catalyst, the nascent products of reaction are more readily removed from the sphere of catalytic influence and are not so likely to undergo secondary reactions. The catalyst preferably should be uniform in size to insure uniform travel and avoid tendencies of larger particles to settle out where the catalyst is being carried along in a gas or vapor stream, in which case, as has been indicated, the velocity and turbulence must be sufficient to keep the catalyst in suspension, especially since the volume of catalyst required ordinarily will be large. For economic and thermal reasons the catalyst should of course remain at reaction temperatures at all times, at least when in contact with the gases or vapors to be treated.

Any apparatus of the general type here indicated, which will mix the finely powdered catalyst with a gas or vapor stream undergoing treatment, maintain the catalyst in suspension during treatment, and effect separation of the catalyst from the treated gases or vapors, is within the range of use in the method of the present invention, as is likewise any such apparatus including provision for the return of the separated catalyst to the circuit.

Such method is applicable to various catalytic treatments, and will be especially useful for the hydrogenation and dehydrogenation of various hydrocarbons, hydrocarbon gases or vapors, and other heat treatment or conversion of such hydrocarbons, even extending as far as gasoline reforming operations wherein the materials are modified chemically to increase their anti-knock value, as well as cracking operations adapted for example to the conversion of heavier petroleum fractions to yield lighter fractions, such as those in the gasoline range, as commonly done in the production of motor fuel.

The following is furnished as illustrative of the value of the present invention. Where using a catalyst composed of equal molar proportions of zinc and zirconium oxides crushed and screened to pass through 10 mesh screen but to be retained on 20 mesh, isobutane gas is passed through the catalyst at 850° F. at a maximum space velocity of about 4,000 cc. of gas per cc. of catalyst per hour with a conversion of about 15% to 16% to unsaturates and hydrogen. The catalyst half-life under these circumstances is about 24 to 36 hours, that is, the catalyst depreciates 50% in activity after 24 to 36 hours of use. Where using the same catalyst finely divided to such a size that all passes through a 300 mesh screen, iso-butane gas may be treated at 850° F., by the suspension of the catalyst therein according to the present invention, at a space velocity in the order of 30,000 to 40,000 cc. of gas per cc. of powdered catalyst per hour with a similar or better conversion rate for the entire volume of gas, and an even longer catalyst half-life. The action will also be improved with other catalysts and with other gases and vapors.

It is to be understood that the present disclosure is made as merely illustrative of the invention, and not as limiting.

I claim:

1. A method for the catalytic treatment of vapors and gases which comprises introducing a finely powdered catalyst into gases or vapors to be treated, neutralizing the electric charge on the catalyst particles, suspending the catalyst particles in said gases or vapors in a reaction zone for a period of reaction, and separating the catalyst from the treated gases or vapors.

2. A method for the catalytic treatment of vapors and gases which comprises commingling a finely powdered catalyst with gases or vapors to be treated, passing the mixture of powdered catalyst with such gases or vapors through a reaction zone at an elevated reaction temperature and at a velocity sufficient to maintain the powdered catalyst in suspension in the gases or vapors for a time to effect the required reaction, passing the treated gases or vapors and powdered catalyst downward in an enlarged relatively quiescent zone for settling of the powdered catalyst from the gases or vapors, then passing the gases or vapors through an electrical precipitating zone thereby electrically precipitating remaining powdered catalyst from the treated gases or vapors, subjecting the electrically precipitated powdered catalyst to treatment to remove the electrical charge imparted to the catalyst particles, removing the treated gases or vapors, and returning the separated powdered catalyst to the reaction zone with additional gases or vapors.

3. A method comprising commingling a powdered catalyst comprising zinc oxide and zirconium oxide with isobutane gas in a reaction zone at a reaction temperature of at least about 850° F., passing said gas and catalyst mixture through said zone at a velocity sufficient to maintain the catalyst suspended in the gas during the reaction period, passing the mixture into a quiescent settling zone whereby catalyst particles settle out, and returning the separated catalyst with further quantities of gas to the reaction zone.

4. A method for the catalytic treatment of vapors and gases which comprises commingling vapors and gases to be treated with a mixture of a finely divided powdered catalyst of relatively high activity and a finely powdered catalyst of relatively low activity, passing said powdered catalysts with such vapors and gases through a reaction zone at an elevated reaction temperature and at a relative velocity to maintain the powdered catalysts suspended in the vapors and gases for the period of treatment, separating the catalysts from the treated gases and vapors, admixing said separated catalyst without intermediate regeneration with finely powdered catalyst of relatively high activity and commingling said mixture of catalysts with vapors and gases to be treated.

5. A method for the catalytic treatment of vapors and gases which comprises commingling vapors and gases to be treated with a mixture of a finely divided powdered catalyst of relatively high activity and with a finely powdered catalyst of relatively low activity, passing said powdered catalysts with such vapors and gases through a reaction zone at an elevated reaction temperature and at a relative velocity to maintain the powdered catalysts suspended in the vapors and gases for the period of treatment, regenerating a portion of said separated catalyst, admixing the remaining portion of catalyst without intermediate regeneration with said regenerated portion of catalyst and commingling said mixture of catalysts with vapors and gases to be treated.

6. A method for the catalytic treatment of iso-butane gas which comprises commingling iso-butane gas to be treated with a catalyst comprising zinc oxide and zirconium oxide in a reaction zone at an elevated dehydrogenation reaction temperature sufficient to effect conversion of said iso-butane gas and separating the catalyst from the reaction mixture.

7. A method for the catalytic treatment of vapors and gases which comprises forming a mixture of a finely powdered catalyst of relatively low activity and a finely powdered catalyst of relatively high activity, contacting vapors and gases to be treated in concurrent flow with said mixture of catalysts at an elevated reaction temperature for a period of time to subject said vapors and gases to catalytic treatment, separating said mixture of catalysts from the treated vapors and gases, admixing said separated catalysts without prior intermediate regeneration with catalyst of relatively high activity and contacting vapors and gases to be treated in concurrent flow with said mixture of catalysts.

WALTER F. HUPPKE.